(12) United States Patent
Miyashita

(10) Patent No.: US 7,059,724 B2
(45) Date of Patent: Jun. 13, 2006

(54) IMAGE PROJECTION SYSTEM AND A METHOD OF CONTROLLING A PROJECTED POINTER

(75) Inventor: Kiyoshi Miyashita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/076,986

(22) Filed: Mar. 11, 2005

(65) Prior Publication Data

US 2005/0151932 A1    Jul. 14, 2005

Related U.S. Application Data

(60) Continuation of application No. 10/315,012, filed on Dec. 10, 2002, which is a continuation of application No. 09/548,346, filed on Apr. 12, 2000, now Pat. No. 6,558,002, which is a continuation of application No. 09/084,399, filed on May 27, 1998, now Pat. No. 6,186,630, which is a division of application No. 08/573,520, filed on Dec. 15, 1995, now Pat. No. 5,782,548.

(30) Foreign Application Priority Data

Apr. 7, 1995    (JP) .................................. 7-108015

(51) Int. Cl.
*G03B 21/14* (2006.01)

(52) U.S. Cl. ........................................ 353/42; 353/122
(58) Field of Classification Search .................. 353/42, 353/122; 348/14.05; 398/107
See application file for complete search history.

(56) References Cited

U.S. PATENT DOCUMENTS

| 4,291,954 A | 9/1981 | Wilson |
| 4,306,782 A | 12/1981 | Sobotta |
| 4,944,578 A | 7/1990 | Denison |
| 5,136,397 A | 8/1992 | Miyashita |
| 5,204,768 A | 4/1993 | Tsakiris et al. |
| 5,237,417 A * | 8/1993 | Hayashi et al. ............. 348/569 |
| 5,302,985 A | 4/1994 | Kennedy et al. |
| 5,371,553 A * | 12/1994 | Kawamura et al. ........... 725/59 |
| 5,422,693 A | 6/1995 | Vojeley et al. |
| 5,428,417 A | 6/1995 | Lichtenstein |
| 5,469,193 A | 11/1995 | Giobbi et al. |
| 5,515,079 A | 5/1996 | Hauck |
| 5,526,011 A | 6/1996 | Hix et al. |
| 5,555,120 A | 9/1996 | Telymonde et al. |

(Continued)

FOREIGN PATENT DOCUMENTS

EP    0 171 747    2/1986

(Continued)

*Primary Examiner*—William C. Dowling
(74) *Attorney, Agent, or Firm*—Oliff & Berridge, PLC

(57) ABSTRACT

The present invention relates to an image projection system whereby a display position of a pointer on a projected image can be easily controlled from a location separated from the main control means. The system comprises a liquid crystal projector, a personal computer for controlling the liquid crystal projector to display a pointer on a projected image in accordance with an operation signal from a main operating section and a predetermined program, and a remote controller for the liquid crystal projector.

The remote controller comprises a pointing device and a light emitting portion for wirelessly transmitting an operation signal.

The liquid crystal projector comprises a light receiving portion for receiving tirelessly transmitted signals. The personal computer controls the liquid crystal projector to transfer the received signals to the personal computer and further controls the display position of the pointer according to the transferred pointing device operation signals.

8 Claims, 15 Drawing Sheets

U.S. PATENT DOCUMENTS

| | | |
|---|---|---|
| 5,557,443 A | 9/1996 | Nakamora et al. |
| 5,568,963 A | 10/1996 | Bennett et al. |
| 5,742,358 A | 4/1998 | Iijima et al. |
| 5,782,548 A | 7/1998 | Miyashita |
| 5,785,403 A | 7/1998 | Chang |
| 5,790,084 A | 8/1998 | Hix et al. |
| 5,859,623 A | 1/1999 | Meyn et al. |
| 5,877,747 A | 3/1999 | Kitao et al. |
| 6,186,630 B1 | 2/2001 | Miyashita |
| 6,558,002 B1 | 5/2003 | Miyashita |

FOREIGN PATENT DOCUMENTS

| | | |
|---|---|---|
| EP | 0 35 627 A2 | 11/1989 |
| EP | A-0-390-041 | 10/1990 |
| GB | 2 276 261 A | 9/1994 |
| JP | 04 077192 A | 3/1992 |
| JP | 6-35602 | 7/1992 |
| JP | A-5-241690 | 9/1993 |
| JP | A-5-291966 | 11/1993 |
| JP | 06 164974 A | 9/1994 |
| JP | 7-64044 | 3/1995 |
| JP | 8-334832 | 12/1996 |

* cited by examiner (FRONT)  (REAR)

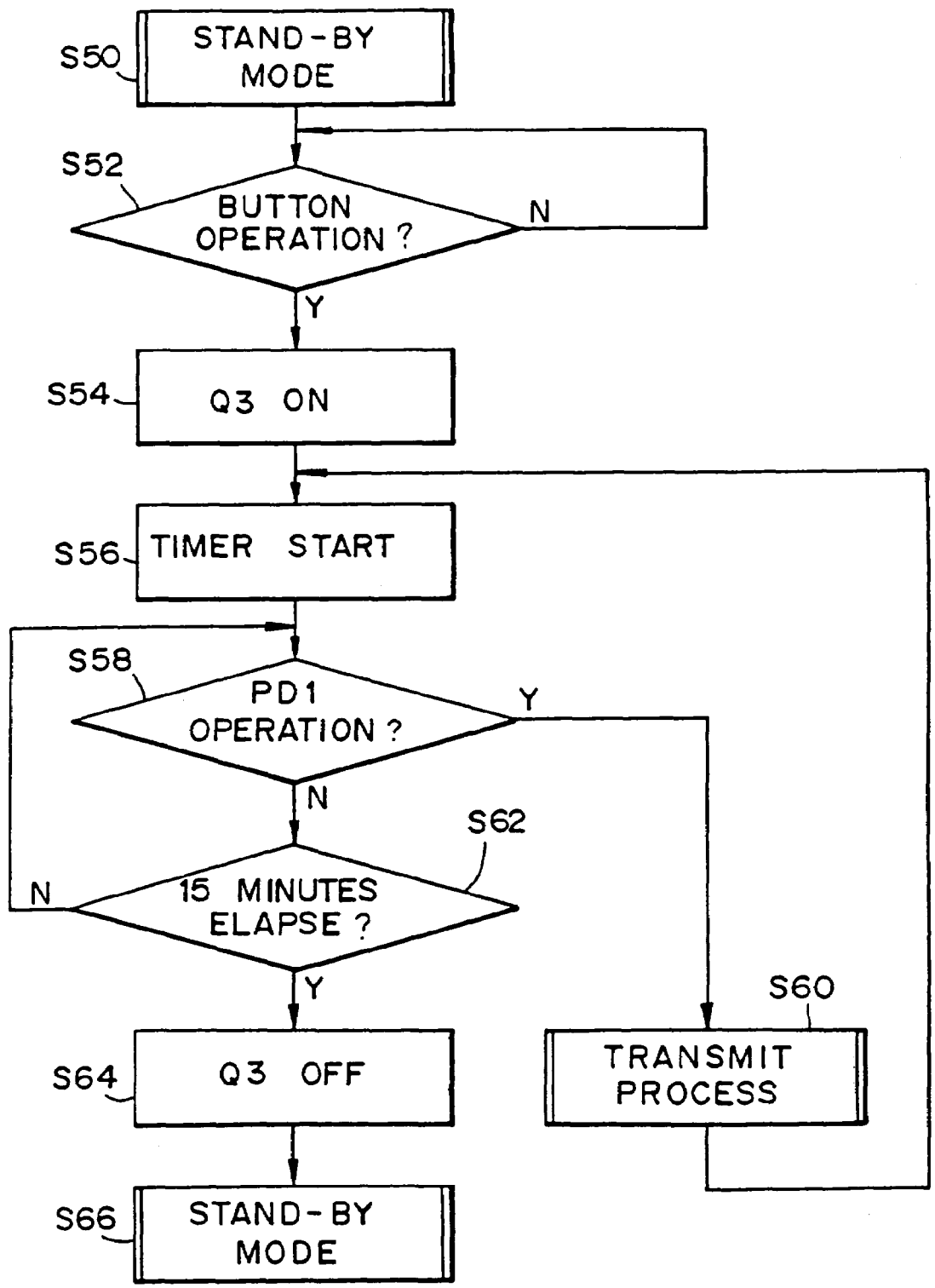

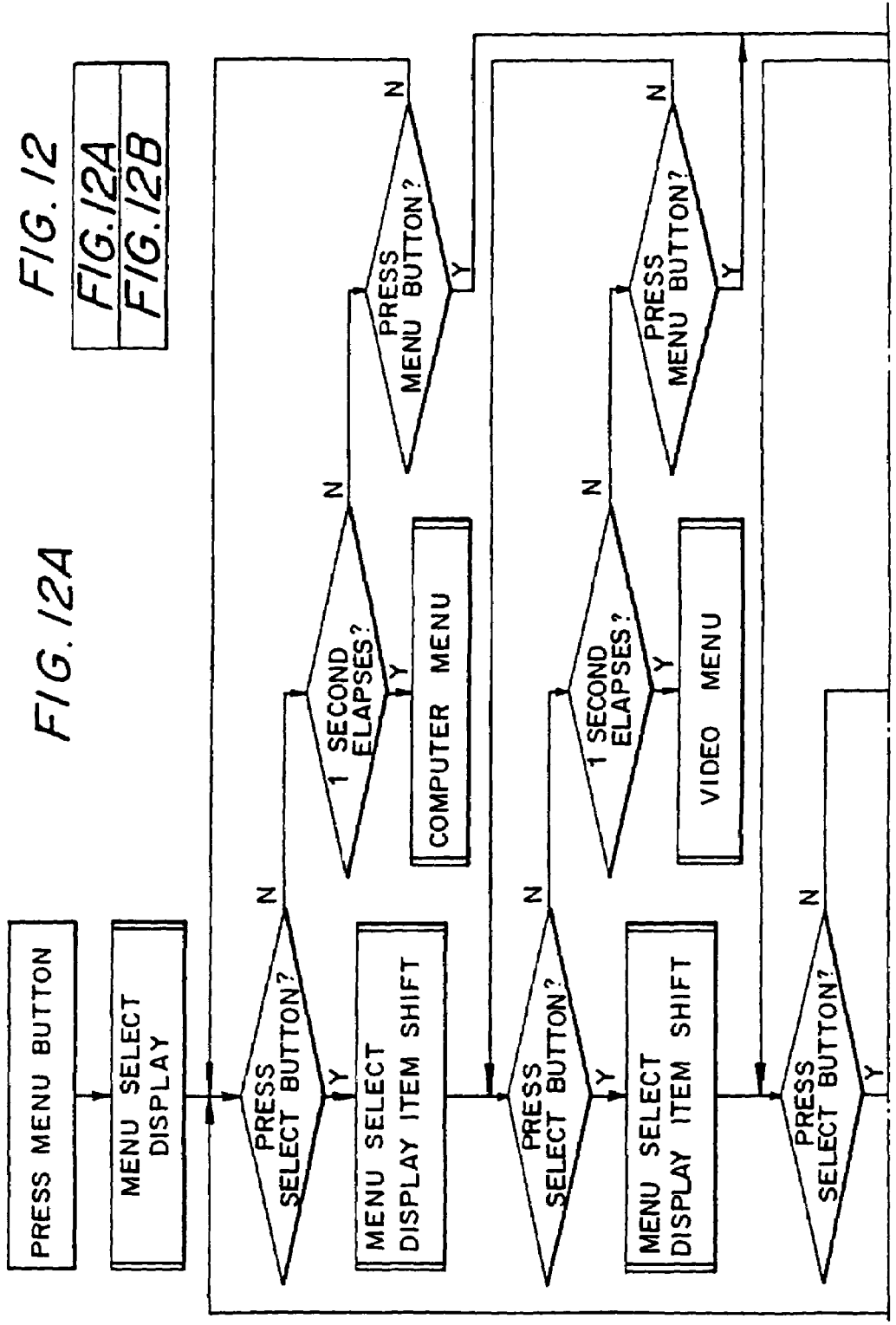

IMAGE PROJECTION SYSTEM AND A METHOD OF CONTROLLING A PROJECTED POINTER

This is a Continuation of application of prior pending application Ser. No. 10/315,012, filed Dec. 10, 2002; which is a continuation of application Ser. No. 09/548,346 filed Apr. 12, 2000, now U.S. Pat. No. 6,558,002, which in turn is a continuation of Application No. 09/084,399 filed May 27, 1998, now U.S. Pat. No. 6,186,630, which in turn is a divisional of application Ser. No. 08/573,520 filed Dec. 15, 1995, now U.S. Pat. No. 5,782,548. The entire disclosure of the prior applications is hereby incorporated by reference herein in its entirety.

BACKGROUND OF THE INVENTION

1. Field of the Invention

The present invention relates to an image projection system and a method of controlling a projected pointer.

2. Prior Art

Multimedia presentation systems utilizing personal computers as the main control means are presently being developed and commercialized. As one example of such systems, a liquid crystal projector is controlled by a personal computer and the image from the personal computer is projected onto a screen using the liquid crystal projector.

Since the same image as shown on the computer display is displayed as an enlarged image using the liquid crystal projector, this image projection system is highly suitable for conducting presentations before large audiences.

In the case of the above mentioned image projection system, a mouse connected to the computer is operated for controlling the position of a pointer such as a cursor projected on the screen. However, during the course of the presentation, the presenter who is standing off the computer cannot easily change the position of the cursor. The presenter has to interrupt the presentation and walk to the computer and mouse in order to change the cursor position. This is inconvenient.

Furthermore, a keyboard connected to the computer must be operated in order to perform functions regarding the liquid crystal projector display such as, page controlling, and this is also very inconvenient.

One conventional approach to solve these problem is to provide a computer operator in addition to the presenter. However, this type of system operation is costly, and a smooth presentation cannot be conducted without close coordination between the presenter and computer operator.

SUMMARY OF THE INVENTION

The present invention recognizes these issues and one object of the invention is to provide an image projection system and a method of controlling a projected pointer, whereby the position of the pointer on the projected image can be easily controlled from a location separated from the main control means.

Another object of the invention is to provide a projection system whereby the position of the pointer on the projected image can be stably controlled from a location separated from the main control means.

Another object of the invention is to provide a projection system whose projecting means can be adjusted from a location separated from the main control means.

Another object of the invention is to provide a projection system whose projecting means can be remotely and stably adjusted from every direction.

In order to achieve the above mentioned objectives, the present invention comprises:

a projecting means for projecting an image onto a desired display area;

a main operating section including a main pointing device;

a main control means for controlling the projecting means to display a pointer on a projected image in accordance with an operation signal from the main operating section and a predetermined control program; and a remote controller for the projecting means; and the remote controller including a pointing device and a wireless transmitting means for wirelessly transmitting an operation signal;

the projecting means including a wireless receiving means for receiving the operation signal from the remote controller; and the main control means including:

means for controlling the projecting means to transfer a received signal from the projecting means to the main control means; and a first detecting means for detecting an operation signal from the main pointing device of the main operating section and an operation signal from the pointing device of the remote controller via the projection means; and wherein the main control means gives priority to an operation signal from the main operating section when operation signals from different portions are received to control a position of the pointer.

A method of controlling a projected pointer of an image projection system which comprises a projecting means for projecting an image onto a desired display area, a main operating section including a main pointing device, main control means for controlling the projecting means to display a pointer on the image projected by the projecting means in accordance with an operation signal from the main operating section and a predetermined control program, and a remote controller for wirelessly transmitting a remote control signal to the projecting means, comprising the steps of:

wirelessly transmitting an operating signal from a pointing device of the remote controller to the projecting means;

transferring the operating signal from the pointing device of the remote controller received by the projecting means to the main control means;

detecting an operation signal from the main pointing device and an operation signal from the pointing device of the remote controller; and giving priority to an operation signal from the main pointing device when operation signals from different portions are received to control a position of the pointer.

In the case of this invention, the main control means controls the projecting means on the bases of the operation signals from the main operating means and a predetermined control program to project the image in a desired display area.

Examples of images that can be projected by the projecting means include an image produced by the main control means itself, and the playback video signals from a VTR, laser disk player and other video playback devices.

During this operation, a position mark such as a cursor controlled by the main control means can be displayed in the projected image.

In the case of this invention, the remote controller comprises a pointing device and tirelessly transmits the pointing device operation signals toward the projecting means. The projecting means transmits the received pointing device operation signals to the main control means and the main control means the positioning mark display position in the projected image display on the basis of the pointing device operation signals.

As a result of this type of construction, an operator can freely control the display position of the position mark on the projected image by merely operating the pointing device of the hand-held remote controller.

Consequently, when a system is constructed using a liquid crystal projector as the projecting means and a personal computer as the main control means, while using the liquid crystal projector to display, for example, an enlargement of an image produced by the personal computer, by operating the pointing device of the hand-held remote controller, a presenter can change the display position of the position mark (e.g., cursor) to match the progress of the presentation.

Also, in the case of this type system, a main pointing device is often connected to the main control means for changing the display position of the cursor type position mark. Consequently, if a conflict occurs between the operations of the main and remote controller pointing devices, a problem arises regarding which of these has priority. According to this invention, in order to maintain system stability in event the above mentioned conflict occurs, the system is constructed whereby priority is assigned to the main pointing device operation signal for controlling the display position of the position mark.

In a preferred embodiment of this invention, an application program for controlling the projecting means is installed, controls the projecting means in accordance with the application program and an operation signal from the operating section.

As a result of this construction, even when a multi-media presentation system is constructed by using an application program on the market, a presenter can easily control the display position of the position mark on the projected image by merely operating the pointing device of the hand-held remote controller.

Also, in the preferred embodiment of this invention, the remote controller further comprises operation keys to which operations of the main operation section are assigned, and
wherein the main control means further comprises means for assigning operations of the main operation section to the operation keys and controls the projecting means in accordance with a signal transmitted by operating the operation keys.

As a result of this construction, the user can input the same signals produced when operating the main operating stage by operating the operation keys provided on the hand-held remote controller. Consequently, the overall system can be used conveniently.

Also, in the preferred embodiment of this invention, the main control means further comprises a second detecting means for detecting an operation signal from the remote controller and an operation signal from the main operation section, and gives priority to an operation signal from the main operating section when operation signals from different portions are received to control the projecting means.

Consequently, in the case of a conflict between the input signals from the remote controller and keyboard, priority can be allocated to the input signal from the keyboard, thereby improving overall stability of the system.

Also, in the preferred embodiment of this invention, the main control means further comprises a display and is formed as a personal computer with an application program; and
wherein the main operating section further comprises a keyboard and a pointing device connected to the personal computer; and
wherein the projecting means is controlled by the personal computer to project an image transmitted from the personal computer or image reproducing means.

As a result of this construction, a commercially available personal computer and projector can be combined to comprise a multimedia presentation system using the projector to project a large picture.

The present invention comprises;
a projecting means for projecting an image including a pointer onto a desired display area;
a remote controller having an operating portion including a pointing device for controlling a display position of the pointer, a lighting key and operation keys; and
a main control means for controlling the projecting means according to an operation signal from the operating portion and a predetermined control program, and for controlling a display position of the pointer in accordance with an operation signal from the pointing device, and
wherein the remote controller comprises an illuminating portion for illuminating the operating portion in accordance with operation of the lighting keys, and a lighting control portion for forcibly putting the illuminating portion off during operation of the pointing device.

In the case of this invention, the lighting means lights to illuminate the operating means keys of the remote controller on the basis of lighted key lighting instructions. When the pointing device of the remote controller is then operated, the lighted lighting means is actively extinguished.

In order to detect pointing device operation, the power consumption is temporarily increased and the power supply circuit voltage declines. As a result, the remote controller internal circuit can operate unstably and impair stable remote control operation.

This type of problem is resolved by forcibly cutting of the lighting means when the pointing device is operated, thereby avoiding power supply circuit instability and enabling stable remote control.

In the case of the preferred embodiment of this invention, the lighting means is forcibly extinguished during pointing device operation, then again lighted after completion of pointing device operation.

In this invention, the lighting control portion goes into a sleep mode to accept no instructions from the lighting key when the pointing device of the remote controller is not operated for a predetermined period.

Thus, when the pointing device of the remote controller is entirely unused for the predetermined time span, non-operation of the remote controller itself is interpreted and even if a lighting instruction is given by the lighted keys, the lighting means is forcibly maintained at off.

As a result of this type construction, in event a lighted key is activated for some reason while the remove controller is not being used, the remote controller power consumption can be conserved. Consequently, a video projection system with long term stable remote control operation can be realized.

In particular, since this invention utilizes a lighting means to forcibly cutoff the remote controller lighting function in conjunction with the pointing device operation, and a sleep function to conserve remote controller power consumption, stable circuit operation together with stable remote control can be realized.

The present invention comprises:
a projecting means for projecting an image including a pointer onto a desired display area;
a remote controller having an operating portion including a pointing device for controlling a display position of the pointer and operation keys; and
a main control means for controlling the projecting means according to an operation signal from the operating portion and a predetermined control program, and for controlling a display position of the pointer in accordance with an operation signal from the pointing device, and
wherein the remote controller goes into a sleep mode to stop power supply to the pointing device, when the pointing device is inactive for a predetermined period.

When the pointing device of the remote controller is entirely unused for the predetermined period, non-operation of the remote controller-itself is interpreted, and the electric power supply to the pointing device of the remote controller, which consumes a lot of electric power, is forcibly cut off.

As a result of this type construction, in event the pointing device is activated for some reason while the remove controller is not being used, the remote controller power consumption can be conserved. Consequently, a video projection system with long term stable remote control operation can be realized.

Also, this invention comprises:
a projecting means for projecting an image including a pointer onto a desired display area;
a remote controller having an operating portion including a pointing device for controlling a display position of the pointer and operation keys; and
a main control means for controlling the projecting means according to an operation signal from the operating portion and a predetermined control program, and for controlling a display position of the pointer in accordance with an operation signal from the pointing device, and
wherein the remote controller transmits a signal for adjusting the projecting means by combining operations of the pointing device and the keys.

As a result of this invention, adjustment signals are transmitted from the remote controller by combined operation of the pointing device and operating keys, thereby enabling the projecting means to be adjusted from a separated position.

In particular, this invention is constructed whereby combined operation of the pointing device and keys transmits adjustment signals from the remote controller to the projecting means. Consequently, the projecting means can be effectively adjusted using a limited number of individual keys disposed on the remote controller.

In the case of a preferred embodiment of this invention, the pointing device and keys for combined operation of the operating section are disposed as mutually related groups.

Further, the pointing device and keys for combination operation disposed on the operation portion have the same color.

As results of these combinations, the projecting means adjustment functions can be easily understood by the user and convenience is greatly enhanced.

For example, by using the same color to designate a group of pointing device and keys, combined operation is easily comprehended by the user and can be performed easily.

Also, the present invention comprises a projecting means for projecting an image onto a desired display area, and a remote controller for the projecting means;
wherein the remote controller includes a wireless transmitting means for wirelessly transmitting an operation signal; and
wherein the projecting means includes a plurality of wireless receiving means for receiving the operation signal which may be transmitted from different directions.

As a result of this type construction, at any change of relative position between the remote controller and projecting means, signals are reliably transmitted from the remote controller toward the projecting means and stable remote control operation is enabled.

Cases often arise during presentations wherein another person conducts part of the presentation, while the presenter moves to a different position and controls the projecting means using the remote controller. In these type of situations, even when the relative position of the remote controller held by the presenter and the projecting means changes, the present invention enables reliable transmission of the remote control signals toward the projector and stable remote control.

BRIEF DESCRIPTION OF THE DRAWINGS

FIG. 11 is a low chart of the remote controller lighting control operation;

DESCRIPTION OF THE PREFERRED EMBODIMENT

Following is a description of the preferred embodiment of the present invention with reference to the attached drawings.

Figure 1:
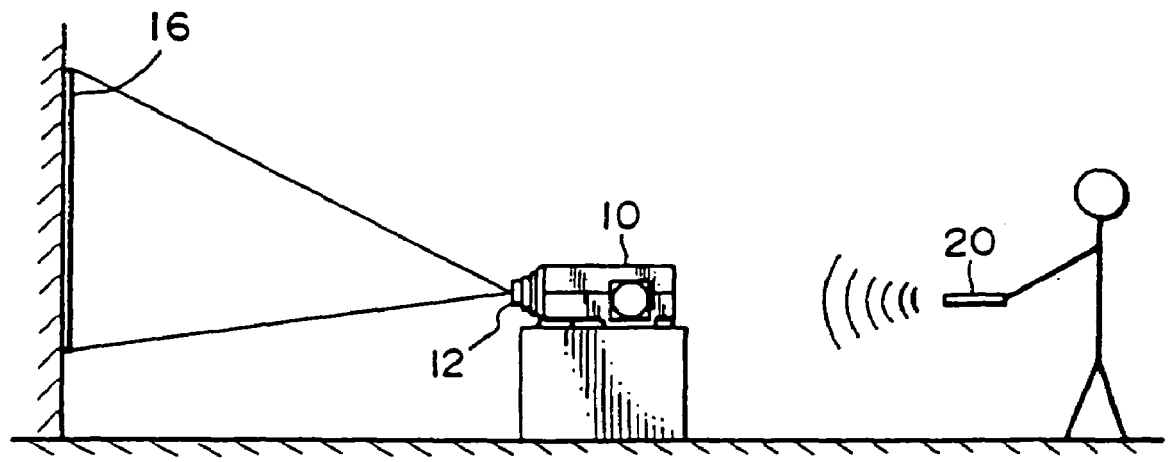
FIG. 1 is a descriptive drawing showing an example of a user operating a liquid crystal projector by means of a remote controller.

FIG. 1 shows an example of a configuration when a projecting means comprising a liquid crystal projector 10 is used to project a predetermined image from a projector output 12 to a desired display area, such as a screen 16. The liquid crystal projector 10 is constructed so as to enable connecting a plurality of video sources to the terminals thereof.

In the case of the present embodiment, two video sources can be connected. A first video source terminal allows connecting a video signal supplied from a computer, and a second video source terminal allows connecting a video playback device such as a video deck, video camera and video disk player. By selecting the video source, the video signal from the computer and video playback device can be selected and projected as a large size picture on the screen 16.

Although the basic operations of the liquid crystal projector 10 can be performed from the various operating facilities provided in the projector mainframe, in the case of this embodiment, the liquid crystal projector 10 can also be remotely operated by using a remote controller 20 for the projector.

Figures 2A, 2B:
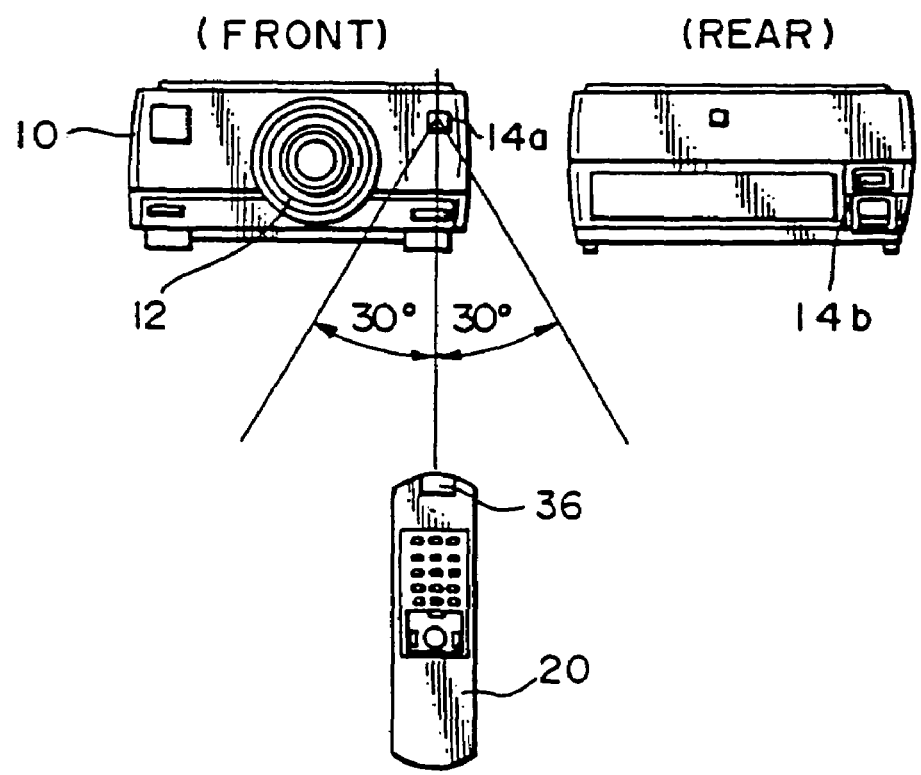
FIG. 2 is a descriptive drawing showing the correspondence between a light emitting means for wireless transmission provided in the remote controller and light receiving means for wireless reception provided in the liquid crystal projector.

As shown in FIG. 2, an infrared light emitting means 36 is provided at the end of the remote controller 20 as a wireless transmitting means for transmitting operation signals to the projector 10.

Wireless receiver means comprising infrared light receiver means 14a and 14b respectively having receiving ranges of 30 degrees left and right in the horizontal direction for a total of 60 degrees are disposed respectively on the front and rear panels of the liquid crystal projector 10. Consequently, an operator can remotely operate the projector 10 from either the front or rear direction of the projector 10 by using the remote controller 20.

Figure 3:
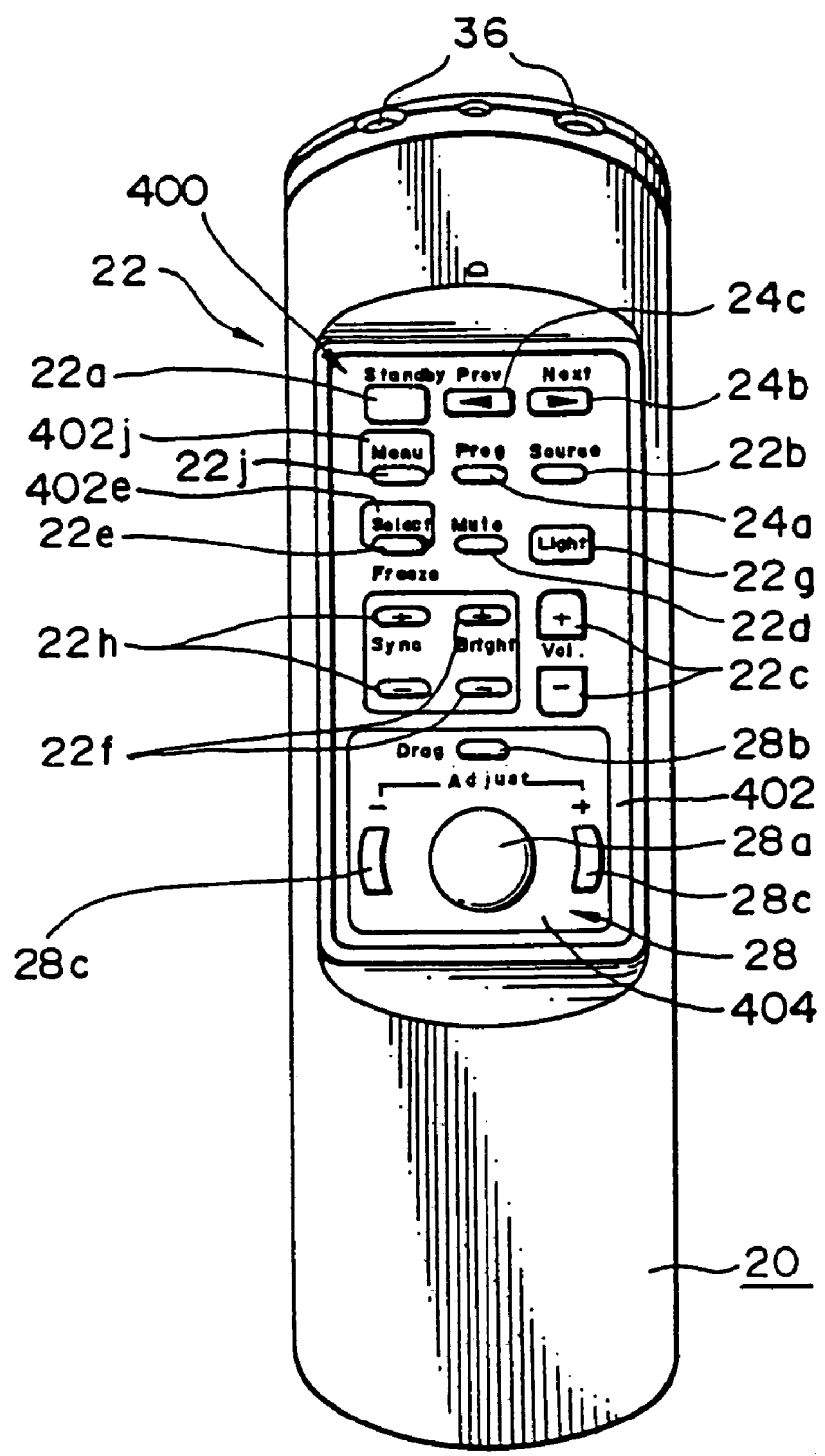
FIG. 3 shows an example of a remote controller.

FIG. 3 shows an abbreviated plan view of the remote controller 20.

In order to remotely operate the liquid crystal projector when power is supplied, the remote controller 20 comprises an operating section 400 having a key group 22 comprising a plurality of buttons.

The key group 22 comprises buttons for standby 22a, source select 22b, audio volume adjustment 22c, audio mute 22d, freeze 22e, brightness adjustment 22f, light level 22g, sync adjustment 22h, and other functions 24a, 24b and 24c.

When the standby button 22a is pressed, the liquid crystal projector 10 lamp lights and warmup begins. The display image is selected for the first or second source by operating the source select button 22b. The output sound volume from a speaker provided in the liquid crystal projector 10 can be adjusted by operating the audio volume adjust button 22c. The sound can be muted by pressing the audio mute button 22d, and restored by again pressing the audio mute button 22d. A still picture can be displayed by operating the freeze button 22e, and the still display mode can be released by again operating this button. The picture brightness can be adjusted by operating the brightness adjust button 22f. When the light level button 22g is pressed, the remote controller 20 operating section 400 lights for approximately 10 seconds, thus enabling easy operation in dark surroundings. Operating the sync adjust button 22h allows adjusting for flickering or out of focus images for optimum clarity.

Construction of the illumination mechanism for lighting the operating section 400 according to the light level key 22g operation is described later below.

Except for the light level button 22g, the same operations as the key group 22 are also provided in the liquid crystal projector mainframe.

The remote controller 20 enables performing the same operations as provided by the operating means of the liquid crystal projector 10 from a separated location.

Figure 4:
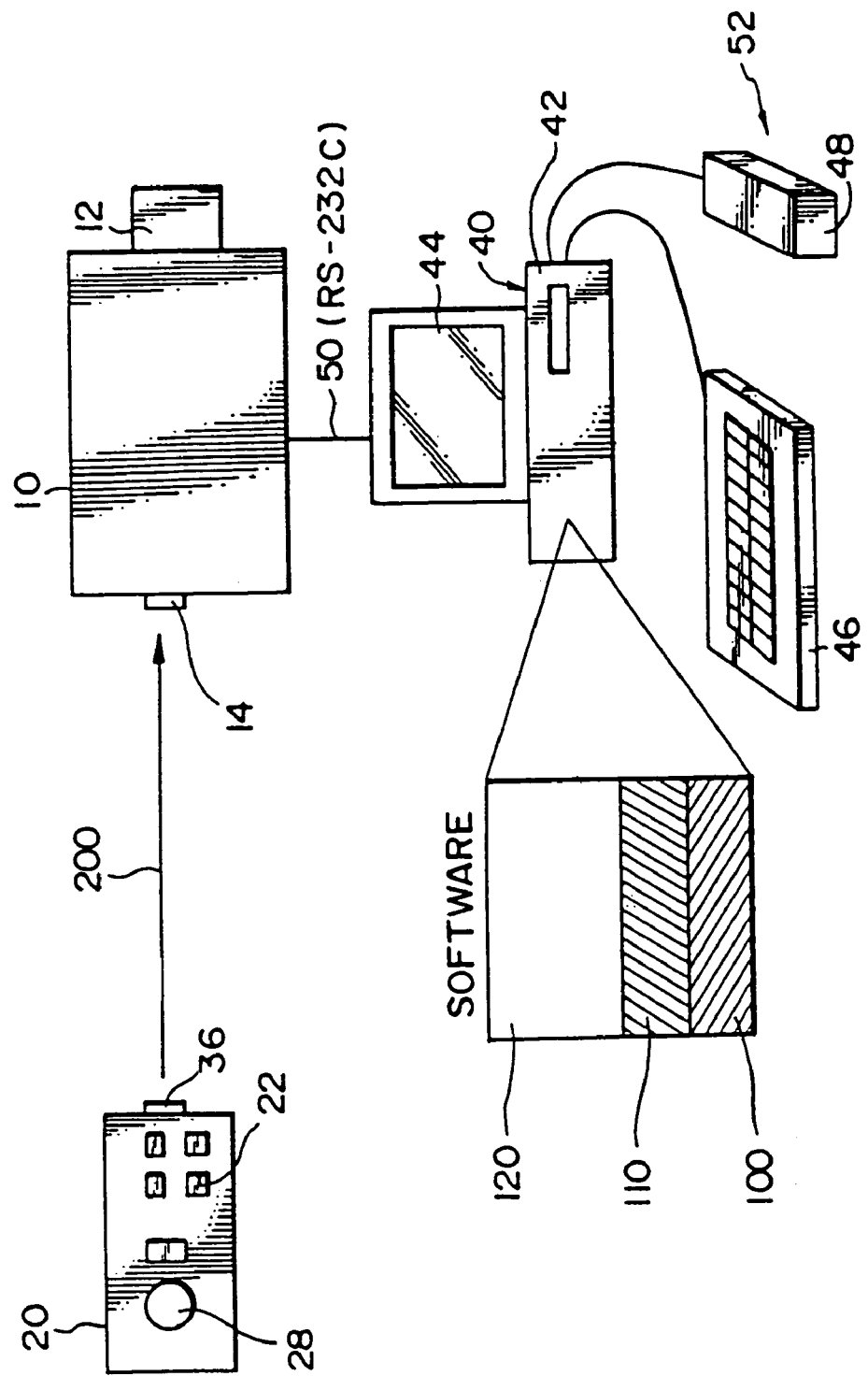
FIG. 4 is an abbreviated descriptive drawing of an example of a video projection system according to this invention comprising a remote controller, liquid crystal projector and personal computer.

As indicated in FIG. 4, in the case of this embodiment, the liquid crystal projector 10, remote controller 20 and a personal computer 40 functioning as the main control means can be combined to comprise a video projection system for multimedia presentations utilizing the personal computer 40 for controlling the liquid crystal projector 10.

The personal computer 40 comprises a computer mainframe 42, a display 44, and a keyboard 46 and 8 mouse 48 function as main operating portion connected to the computer mainframe 42. The liquid crystal projector 10 and personal computer 40 mainframe 42 are connected via a serial transmission line 50 (RS-232C): for serial transmission of digital data.

By constructing a system in this manner whereby the liquid crystal projector 10 is directly operated from the computer 40, when conducting a presentation using a system according to this embodiment, for example, not only the projector 10 adjustments such as picture brightness and sound volume, but also picture display control functions such as page advance, page reverse, and window open and close, can be performed without interrupting the presentation.

A predetermined operating system 100 and projector 10 driver software 110 are installed beforehand in the computer mainframe 42 and stored in an internal memory. In addition, various types of application software are also installed in the computer mainframe 42. In the case of this embodiment, application software for presentation use is installed.

The driver software 110 is a type of device driver. According to commands produced by the operating program 100 and application software 120, the driver software 110 performs actual detailed processing and data transfer with respect to the liquid crystal projector 10 in the computer 40.

In particular, the driver software 110 is comprised so as to completely control the liquid crystal projector 10 via the serial transmission line 50. In practical terms, a completely different picture from the projector 10 image is displayed for adjustment on the display 44 of the computer 40, while the liquid crystal projector 10 brightness, sound volume and other adjustments are performed by the remote controller 20 and the operation means provided in the projector 10 mainframe. These types of operations are performed by the operator using the mouse 48 and keyboard 46 to apply the required commands to the computer 40.

As mentioned above, when conducting a presentation or other program wherein application software 120 for presentations is installed in the computer mainframe 42 and the projector 10 is used to display an image for presentation on the screen 16, the personal computer 40 operator operates predetermined keys of the keyboard 46 and operates the mouse 48 functioning as a pointing device to control the display position of the cursor or other indicator.

In particular, when conducting a presentation wherein a cursor points to a part of the screen, the cursor is shifted to the required icon display position, and a command is selected, and when expanding or compressing a certain display area within the picture, and when opening another window within the picture, the mouse 48 is normally used for controlling the cursor display position.

Also, when inputting various commands, characters and other types of data to the personal computer 40, the operator operates predetermined keys of the keyboard 4G according to requirements.

Consequently, if a projection system combining a personal computer 40 and projector 10 such as illustrated in FIG. 4 is adopted, the operator must be located near the personal computer 40 in order to operate the mouse 48 and keyboard 46. As a result, the presenter conducting a presentation using the projector 10 must continually convey various instructions to the operator operating the personal computer 40. In absence of an operator, the presenter must continually shift to the personal computer 40 position and operate the mouse 48 and keyboard 46. In either of these cases, a smooth presentation cannot be conducted.

In order to resolve this type of difficulty, the remote controller 20 according to the present embodiment incorporates pointing device functions of the mouse 48 or other devices connected to the personal computer 40 mainframe, and input functions for commands and data sent from the mouse 48 and keyboard 46.

The remote controller 20 operating section 400 example shown in FIG. 3 comprises a trackball means 28 functioning as a pointing device, a key group 22 and a button group 24.

The trackball means 28 comprises a trackball 28a, a drag button 28b and an opposing adjust button 28c. The computer mainframe 42 with installed driver software 110 controlling the projector 10 was previously described.

Operation signals transmitted wirelessly using infrared light 200 from the remote controller 20 directed toward the projector 10 are first transferred from the projector 10 to the computer mainframe 42 via the serial transmission line 50. The computer mainframe 42 then assigns the various functions with respect to the remote controller 20 trackball means and key group. When an operation signal is input from the remote controller 20, various computation processes are performed according to the functions assigned to the input signal.

Subsequently, the projector 10 control, image display control and other required computations and controls are performed.

Figure 5:
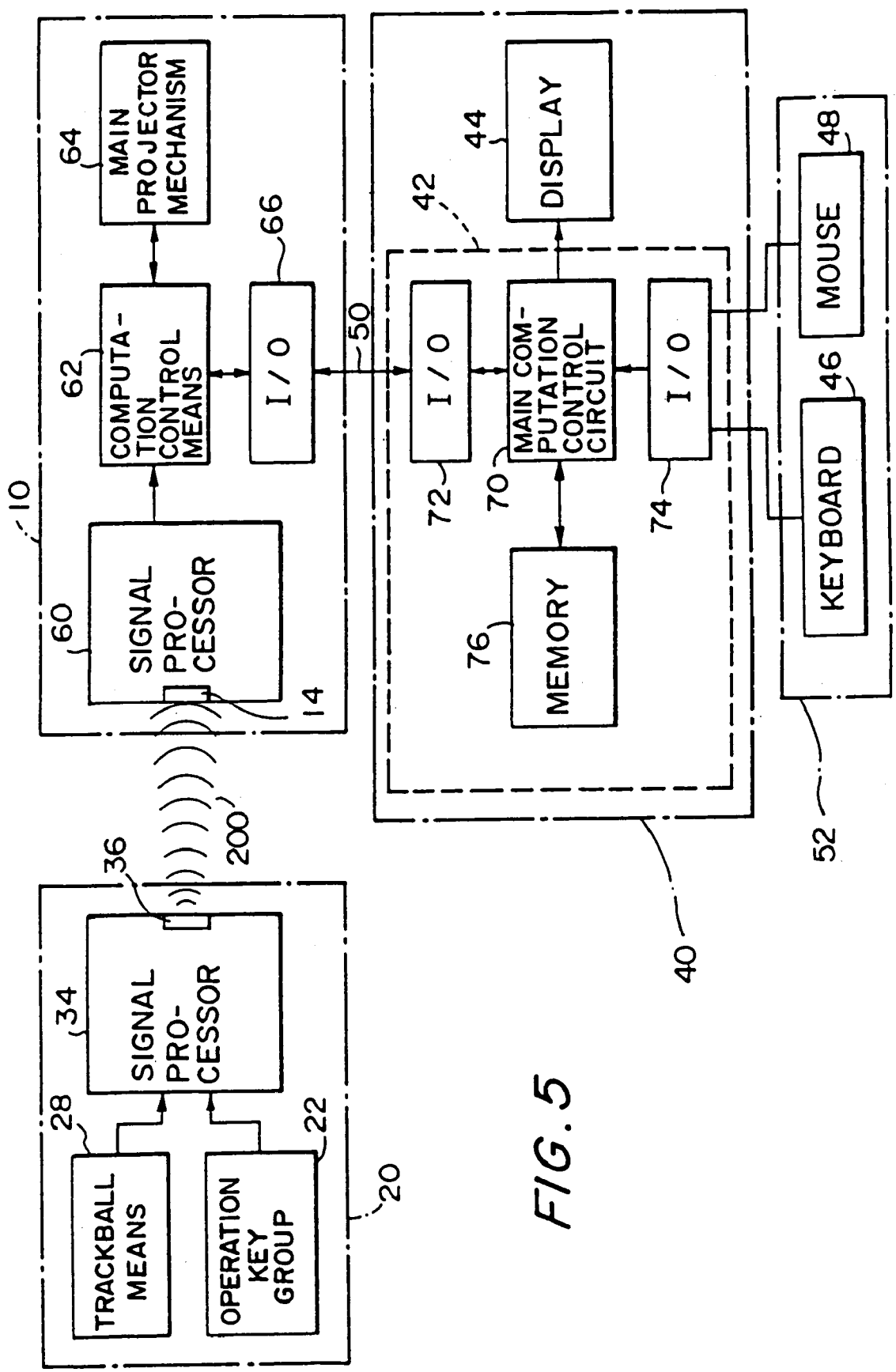
FIG. 5 is a functional block diagram of the system shown in FIG. 4.

FIG. 5 is a functional block diagram of a video projection system according to the present embodiment.

As mentioned above, the remote controller 20 includes a trackball means 28 and operation key group 22. A signal processor 34 is used to convert these signals into digital signals sent wirelessly via infrared light 200 from the infrared transmitter means 36 to the projector 10.

The projector 10 comprises a main projector mechanism 64 performing the basic operations as a projector, a computation controller 62 comprising a CPU and memory for controlling the main projector mechanism 64, a signal processor 60 for processing the signals from the remote controller 20 received by an infrared receiver means 14 and converting these into electrical signals supplied to the computation controller 62, and an I/O interface 66 for connection to external equipment.

When the projector 10 is under the control of the personal computer 40, the computation controller 62 transfers the operation signals from the remote controller 20 received by the infrared receiver means 14 to the personal computer 40 via the I/O interface 66 and serial transmission line 50. In addition, the main projector mechanism 64 and other locations controlled on the bases of various control signal inputs from the personal computer 40 via the serial transmission line 50 and I/O interface 66.

The computer mainframe 42 of the personal computer 40 comprises a main computation control circuit 70 comprising a CPU and other circuits, a memory 76 comprising RAM, ROM and other circuits for storing the application software 120, driver software 110, operating system 100 programs and other required data, and I/O interfaces 72 and 74 for performing external connections.

The main computation control circuit 70 processes the remote controller 20 operation signals transferred via the projector 10 in the same manner as the mouse 48 and keyboard 46 comprising the main operating portion 52, and performs various computation control operations.

In the case of this embodiment, the operation signals of the trackball means 28 and mouse 48 are processed in the same manner. Also, the commands and key operations assigned to the operation key group 22, and the corresponding commands from the mouse 48 and keyboard 46, and the corresponding key inputs from the keyboard 46 are processed in the same manner.

In event a conflict occurs between the operation signals from the remote controller 20 and the operation signals from the keyboard 46 and mouse 48 comprising the main operating portion 52 (for example, a conflict between the operations of the trackball means 28 and mouse 48), the signals from the remote controller 20 are disregarded and priority is given to the operation signals from the main operating portion 52. The reason for this configuration is because application software for presentations is generally composed on the concept of operating a main operating means 52 comprising a mouse 48 and keyboard 46 directly connected to the personal computer 40, and not from the viewpoint of signals from a remote controller 20. Consequently, overall system stability can be increased by assigning processing priority to operation signals from the main operating means 52.

As a result of this embodiment, personal computer 40 operations which ordinarily needed to be performed by means of a directly connected mouse 48 and keyboard 46 can be easily performed by means of a hand-held remote controller 20. Moreover, a multimedia presentation using a system comprising a projector 10 and personal computer 40 can be efficiently and smoothly conducted.

In particular, the pointing device function for controlling a cursor position is an extremely important factor in various types of application software. By providing this type of pointing device function in the remote controller 20, presentations using the projector 10 can be performed very smoothly.

Figure 6:
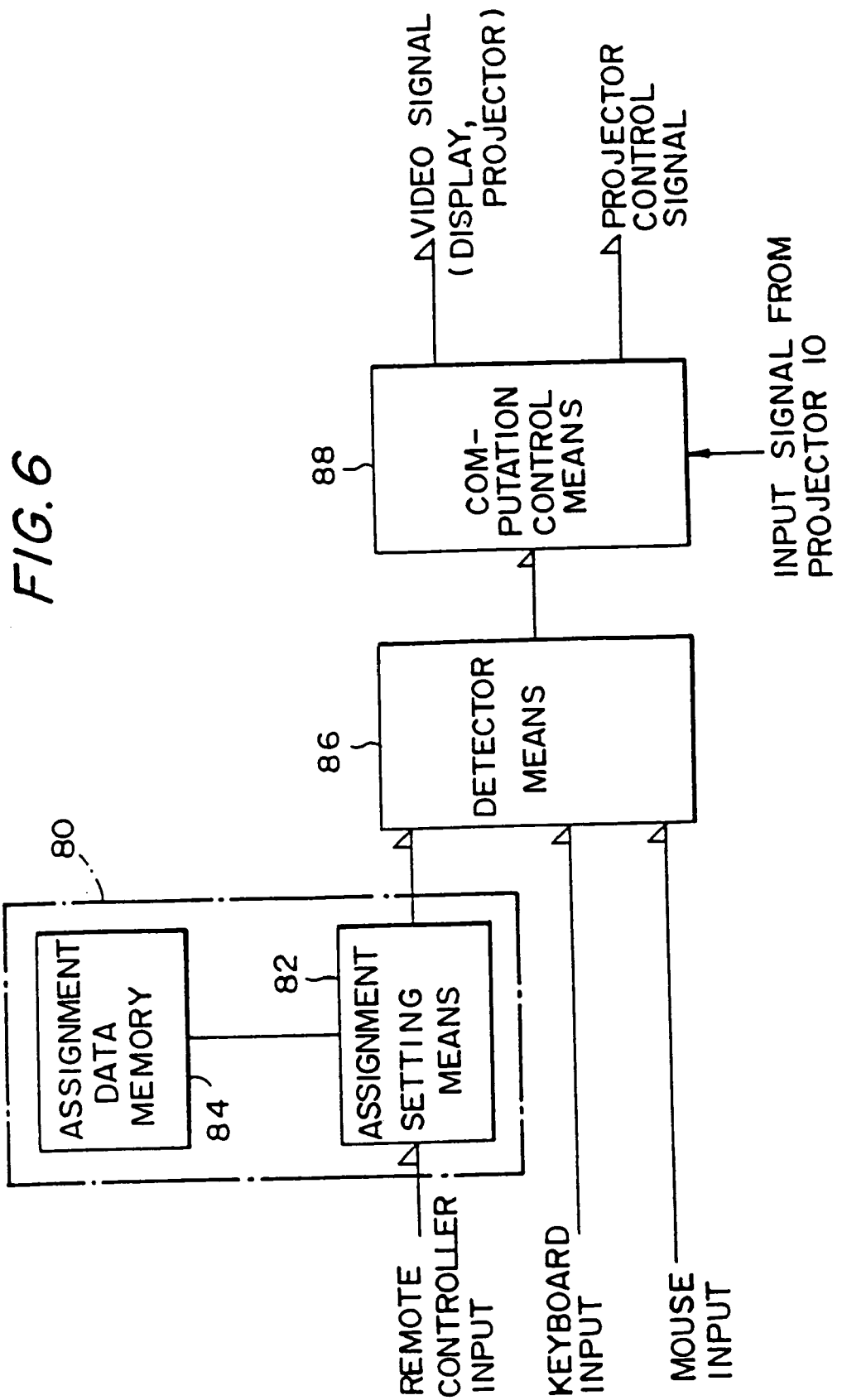
FIG. 6 is a functional block diagram of main components of the system shown in FIG. 5.

FIG. 6 is a functional block diagram of a computer mainframe 42 comprising a memory 76 and main computation control circuit 70. The computer mainframe 42 according to this embodiment comprises an assigning means 80, a detector means 86 and a computation control means 86.

Figure 7:
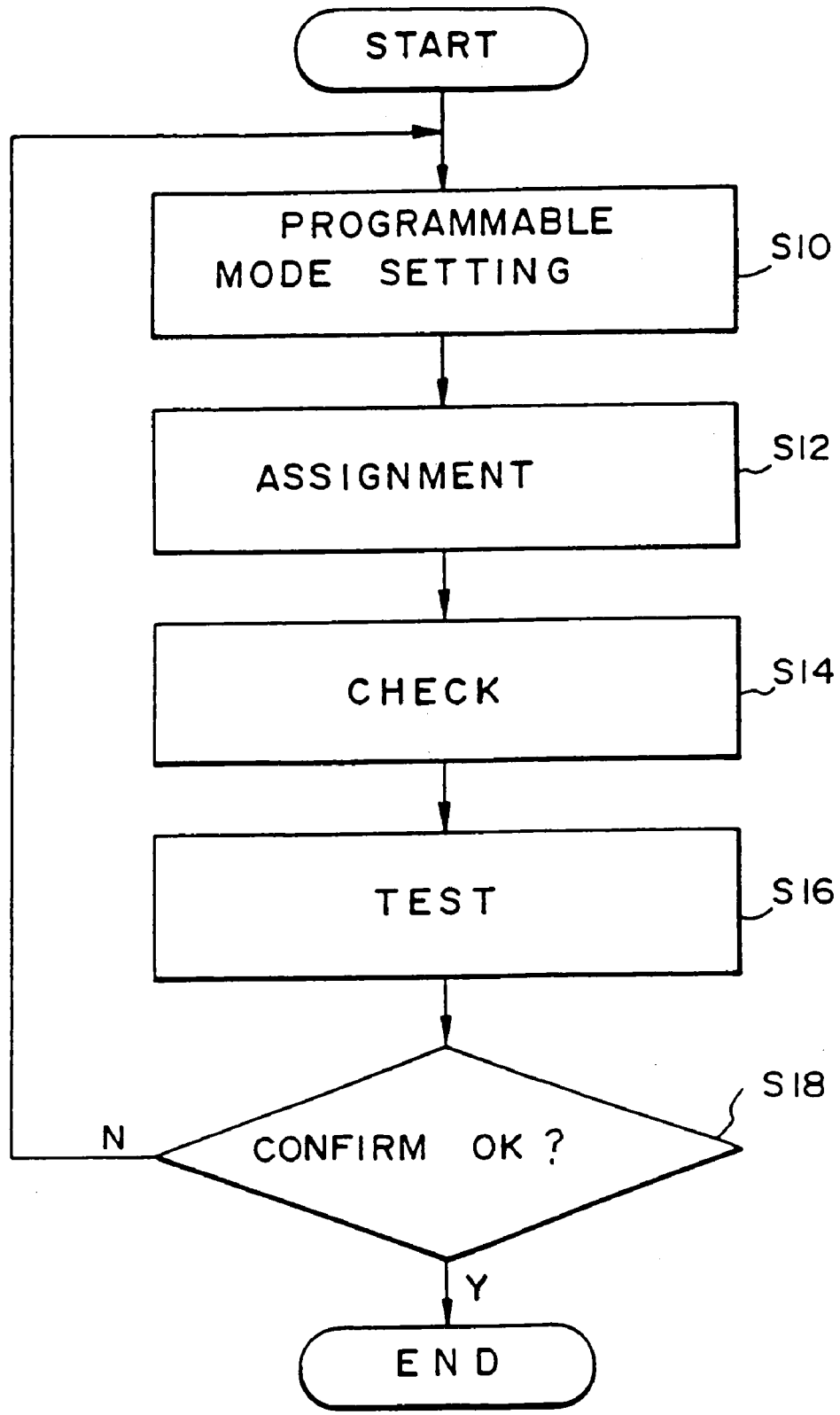
FIG. 7 is an operation flow chart of the system shown in FIG. 6.

FIG. 7 shows an abbreviated flow chart of the assignment setting operation for the remote controller 20 trackball means 28 and operation key group 22.

The programmable mode for performing assignments can be set by operating the keyboard 46 and mouse 48 connected to the computer mainframe 42 (Step S10).

Figure 8:
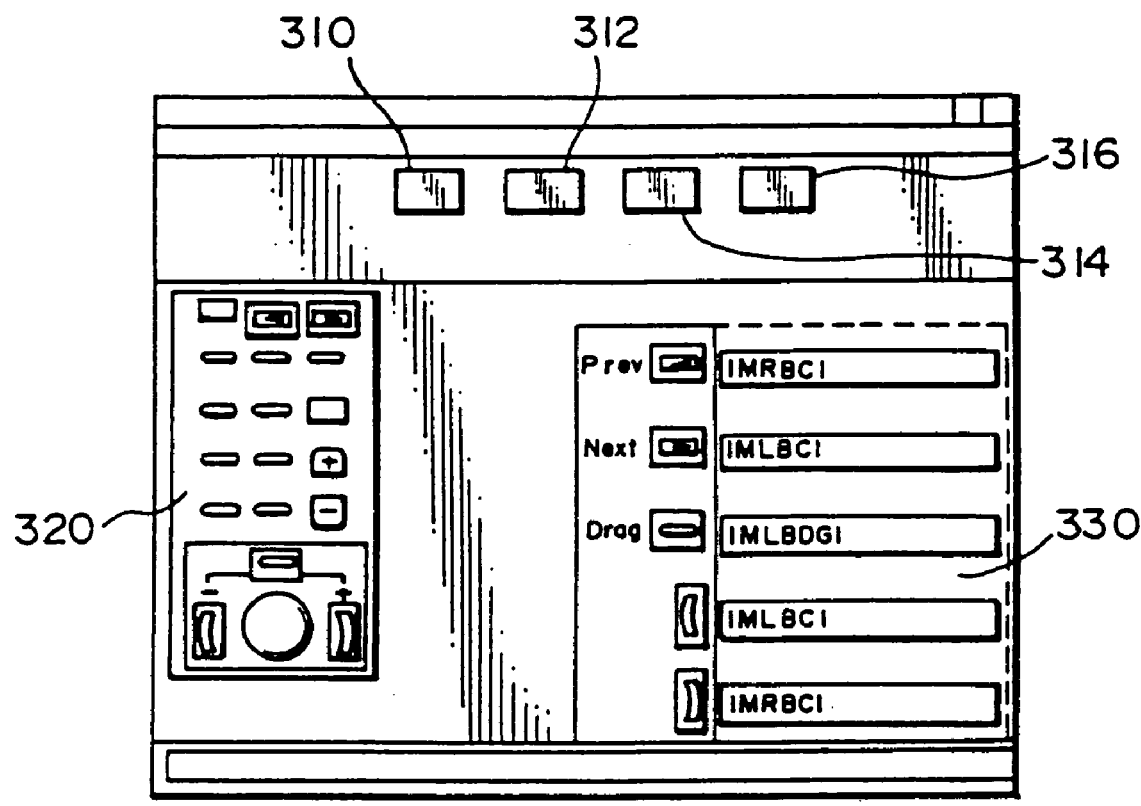
FIG. 8 is a descriptive drawing of the assignment setting screen shown on the display.

When the programmable mode is set, an assignment setting screen such as indicated in FIG. 8 is displayed on the personal computer 40 display 44 and projected from the projector 10. Icons for respective buttons key set 310, key help 312, execute 314 and button test are displayed at the top of the screen.

At the bottom of the screen, a program assignment box 330 showing the present assignments for the remote controller operating means 320 and other operating means is displayed.

In this state, the assignment enable mode is set by shifting the cursor at the top of the screen to the key set button 310 icon and clicking (step S12). By then shifting the cursor to the required operating button of the operating means display 320 and clicking, the corresponding button is highlighted and the corresponding button within the program assignment box 330 is displayed. In the FIG. 8 example, buttons for page return 24c, page advance 24d, drag 28b and the pair of adjust buttons 28c are shown selected for respective assignments.

After selecting the buttons in this manner, the various functions are assigned to the selected buttons. In this example, the mouse 48 functions such as click and drag are assigned to the five selected buttons.

Also, according to requirements, page advance, page return and other commands, macros (maximum 32 keystrokes and mouse command sequence) and other key inputs can be assigned. By setting in this manner, a required program can be opened by simply pressing corresponding buttons of the remote controller during the presentation.

The keyboard 46, for example, can be used for assigning these types of functions.

After completing assignments, by shifting the cursor to the execute button 314 position and selecting this button, the computer mainframe 42 is set to the check mode (step S14). As a result, the various functions using the remote controller 20 assigned in the assignment enable mode (step S12) can be executed.

Afterwards, when the test button 316 is selected, a text screen appears in the display and projector screens indicating the keystrokes assigned to the remote controller 20 buttons, whereupon the user can check whether or not the assignments were correctly performed by observing the screen display.

If a setting error is noted at this time, it is sufficient to return to step S10 and change the assignment as required. Conversely, in order to confirm the assignments were correctly performed (step 518), again operate the test button 316 to release the test mode, whereupon the assignment operation with respect to the remote controller 20 is completed.

The data assigned to each key are stored in an assigned data memory means 84. Afterwards, on the basis of the input signal from the remote controller, the assignment setting means 82 converts the data into a signal expressing the assignment function corresponding to the input signal sent to the detector means 86. For example, at the operation signal inputs from buttons 24b and 24c, the operation signals are converted into mouse 48 click and drag signals, and sent to the detector means 86. The assignment functions corresponding to the mouse 48 operation with respect to the remote controller 20 trackball means 28a are stored beforehand in the assigned data memory means 84.

Consequently, when the trackball means 28a is moved up, down, left and right, and the corresponding signals are sent from the remote controller 20 to the assignment setting means 82, the assignment setting means 82 converts these into mouse 48 operation signals for supply to the detector means 86. As a result of this operation, by operating the remote controller 20, the same operation signals as the mouse 48 and keyboard 46 are sent to the computer mainframe 42, thereby enabling control of the computer mainframe 42.

The function of the detector means 86 indicated in FIG. 6 is described as follows. A signal input applied from the assignment setting means 82 is compared with an input signal from the main operating means 52 comprising the mouse 48 and keyboard 46. The detector means 86 then detects whether or not there is a conflict with respect to the input from the remote controller 20. In absence of a conflict, the present input signal is sent directly to the computation control means 88. For example, when a signal input is supplied only from the remote controller 20 while an input signal from the mouse 48 and keyboard 46 is absent, the input signal is supplied directly to the computation control means 88. Conversely, if there is a conflict between the signals from the main operating portion 52 and remote controller 20, only the input signal from the main operating portion 52 is sent to the computation control means 88 and recognition of the signal from the remote controller 20 is denied. As a result, the overall system stability can be increased as mentioned above.

The computation control means 88 computes the control signal in accordance with the selected input signal via the detector means 86 and the above mentioned computation control programs 100, 110 and 120 for supply to the projector 10, and computes each type of video signal for supply to the display 44 and projector 10. In addition, the computation control means 88 computes and supplies the projector control signal output in accordance with the input signal from the projector 10.

As result of this embodiment, by using remote control signals from a remote controller 20 ordinarily designed for a projector, a computer mainframe 42 can be operated in the same manner as from signals from a mouse 48 and keyboard 46, and the projector 10 can be controlled with respect to the computer mainframe 42.

In particular, in the case of the present system, since various functions are assigned to the remote controller 20 used for controlling the projector 10 for controlling the personal computer 40, the computer can be directly operated by using the remote controller 20. As a result, an extremely easy to use video projection system for multimedia presentations can be comprised using a projector 10 and personal computer 40.

Following is a description of the remote controller 20 lighting mechanism according to this embodiment.

When the light level button 22g is set to on, the operating section 400 of the remote controller 20 lights for a predetermined period of time. Therefore, the operating section 400 comprises a plurality of buttons and a trackball 28a disposed on a semi-transparent substrate 402, and a plurality of illuminating LEDs disposed at the rear of the substrate 402 for illuminating the operating section 400.

Figure 9:
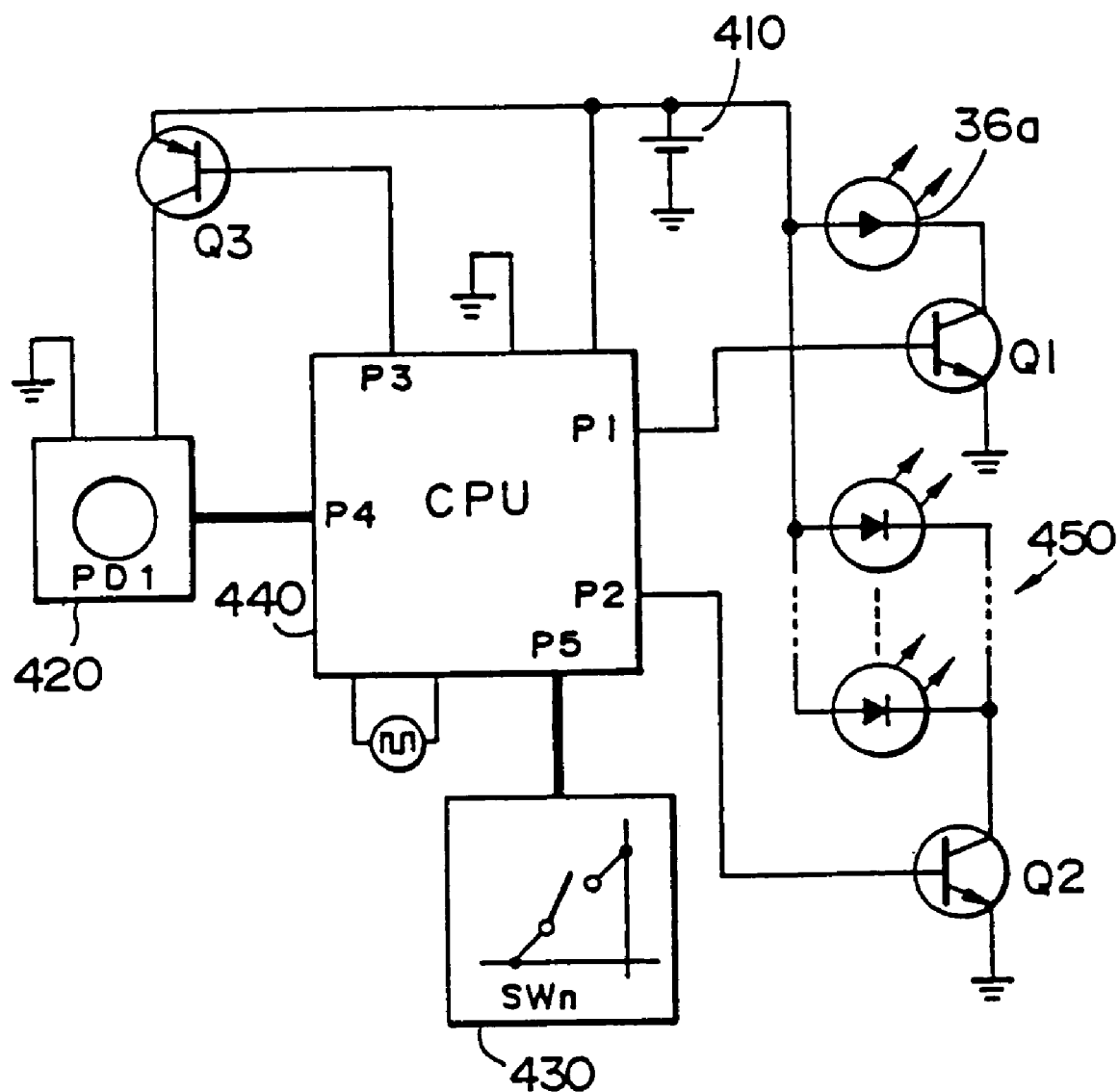
FIG. 9 is a descriptive drawing of the remote controller internal circuit.

FIG. 9 shows the circuit construction of the remote controller 20 lighting mechanism.

The remote controller 20 comprises a replaceable battery 410, an operation detector 420 detecting operation of the trackball 28a, an operation switch matrix 430 detecting operation of, respective button groups 24 and 28, a CPU 440 controlling the overall remote controller, illuminating LEDs 450 disposed at the rear of the substrate 402 and illuminating the operating section 400, and a light emitting means 36 comprising a transmitting LED 36a.

The CPU 400 controls a transistor 01 to drive the transmitting LED 36a to wirelessly transmit remote control signals using infrared light 200 from the light emitting means 36 toward the projector 10.

In addition, the CPU 440 detects the light level button 22g operation on the basis of a signal from the operation switch matrix 430 and switches transistor Q2 on to light the illumination LED group 450 for a predetermined period of time.

Also, the operation detector 420 detects trackball 28a operation and sends a detection signal to the CPU 440. As a result, the CPU 440 wirelessly transmits the trackball 28a operation signal toward the projector via the transmitting LED 36a.

When the operation detector 420 detects the trackball 28a operation, the power consumption increases. Consequently, the voltage temporarily declines in the remote controller 20 circuit due to using a small capacity battery 410, thereby presenting a risk of overall circuit operating instability. In order to prevent this occurrence, the CPU 440 forcibly switches off transistor Q2 when the operation detector 420 detects trackball operation in order to extinguish the illumination LED group 450. As a result, power supply circuit instability during trackball 28a operation can be avoided and reliable remote control operation can be achieved.

In addition, when a signal input from the operation detector is absent for a predetermined length of time (15 minutes in the present example), the CPU 440 shifts to a sleep mode whereby lighting commands from the light level button 22g are not recognized. Thus, when the trackball 28a is completely inactive for 15 minutes, non-operation of the remote controller 20 is interpreted and power consumption of the remote controller 20 is conserved by operating the lighting function in the sleep mode.

In addition, when a signal input from the operation detector 420 is absent for a predetermined length of time, the CPU 440 shifts to a sleep mode whereby the electric power supply from the battery 410 to the operation detector 420 is forcibly cut off in order to put the trackball into sleep. The electric power is again supply to the operation detector 420 when any one of the operation keys is operated. As a result of this, electric power consumption of the remote controller 20 is conserved during the remote controller 20 is not operated even when the trackball 28a is operated by is mistake.

Figure 10:
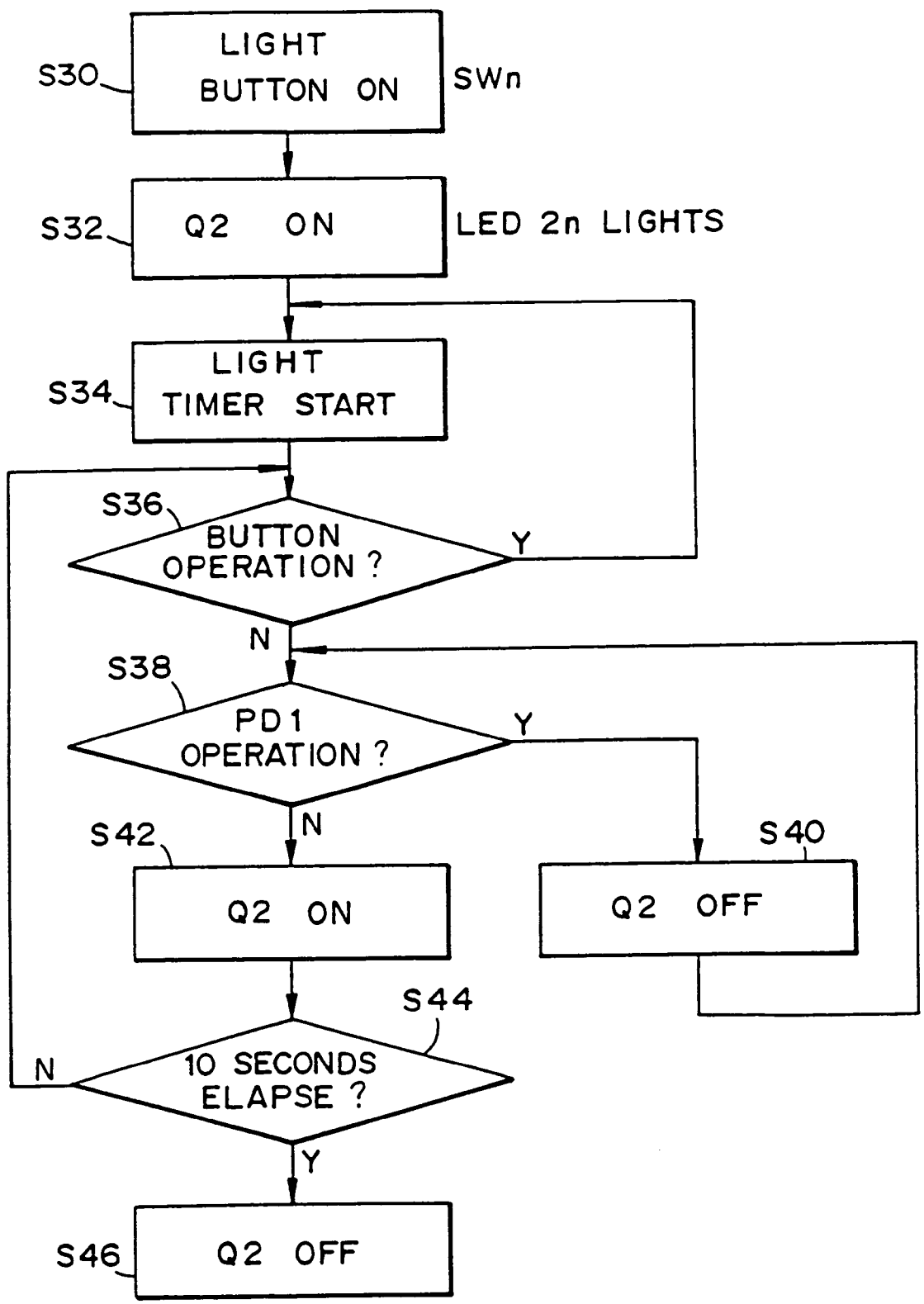
FIG. 10 is a flow chart of the remote controller lighting control operation.

FIG. 10 indicates a flow chart of the circuit light level control operation.

When the remote controller 20 light level button is set to on (step S30), transistor Q2 is switched on (step S32) and controls the illumination LED group 450 lighting. As a result, the operating section 400 is lit from the rear of the semi-transparent substrate 402, thereby enabling easy operation even in darkened surroundings.

Simultaneously with control of the illuminating LED group 450 lighting, the CPU 440 internal lighting timer starts (step S34) and after 10 seconds elapse (step S44), transistor Q2 is controlled to automatically extinguish the illumination LED group 450 (step S48).

Also, pressing either one of the buttons 24 and 28 while the illumination LED group 450 is lighted (step S36) resets the lighting timer (step S34). As a result, lighting of the operating section 400 continues only when either of these buttons is operated.

When the trackball 28a is operated during lighting (step S38), transistor Q2 is automatically switched off, thereby forcibly extinguishing the illumination LED group 450. Afterwards, when the trackball 28a operation stops, transistor Q2 switches on to thereby resume LED group 450 lighting.

Therefore, during trackball 28a operation, which consumes a large amount of power, the illumination LED group 450 is forcibly cutoff, thereby minimizing battery 410 voltage decline and enabling stable remote control operation.

FIG. 11 shows a flow chart of the sleep function according to this embodiment.

In complete absence of operating section 400 operation, the CPU 440 assumes a stand-by mode (step S50). When any button is operated (step S52), transistor Q3 switches on (step S54) and the CPU 440 timer starts (step S56).

At a trackball 28a operation signal input during timer operation, the CPU 440 transmits this signal using transmitting LED 36a (step S60) and restarts the timer (step S56).

Also, in complete absence of a trackball 28a operating signal input for 15 minutes after timer start (step S62), transistor Q3 is forcibly switched off (step S64) and the stand-by mode is produced (step S66). In the stand-by mode, even if the light level button is operated, the operation signal is not recognized by the CPU 440.

In this manner, if the trackball 28a of the remote controller 20 is completely inoperative for 15 minutes, absence of remote controller operation is interpreted and the sleep mode is produced wherein the illumination LED group 450 light commands are disregarded, thereby enabling conservation of the remote controller 20 power consumption.

As described above, according to the present embodiment, the lighting function of the remote controller 20 illumination LED group 450 is forcibly cutoff in conjunction with the trackball 28a operation and sleep operation is produced, thereby both conserving the remote controller 20 power consumption and enabling stable circuit operation.

Also, the remote controller 20 is provided with projector 10 adjustment functions.

Figure 12B:
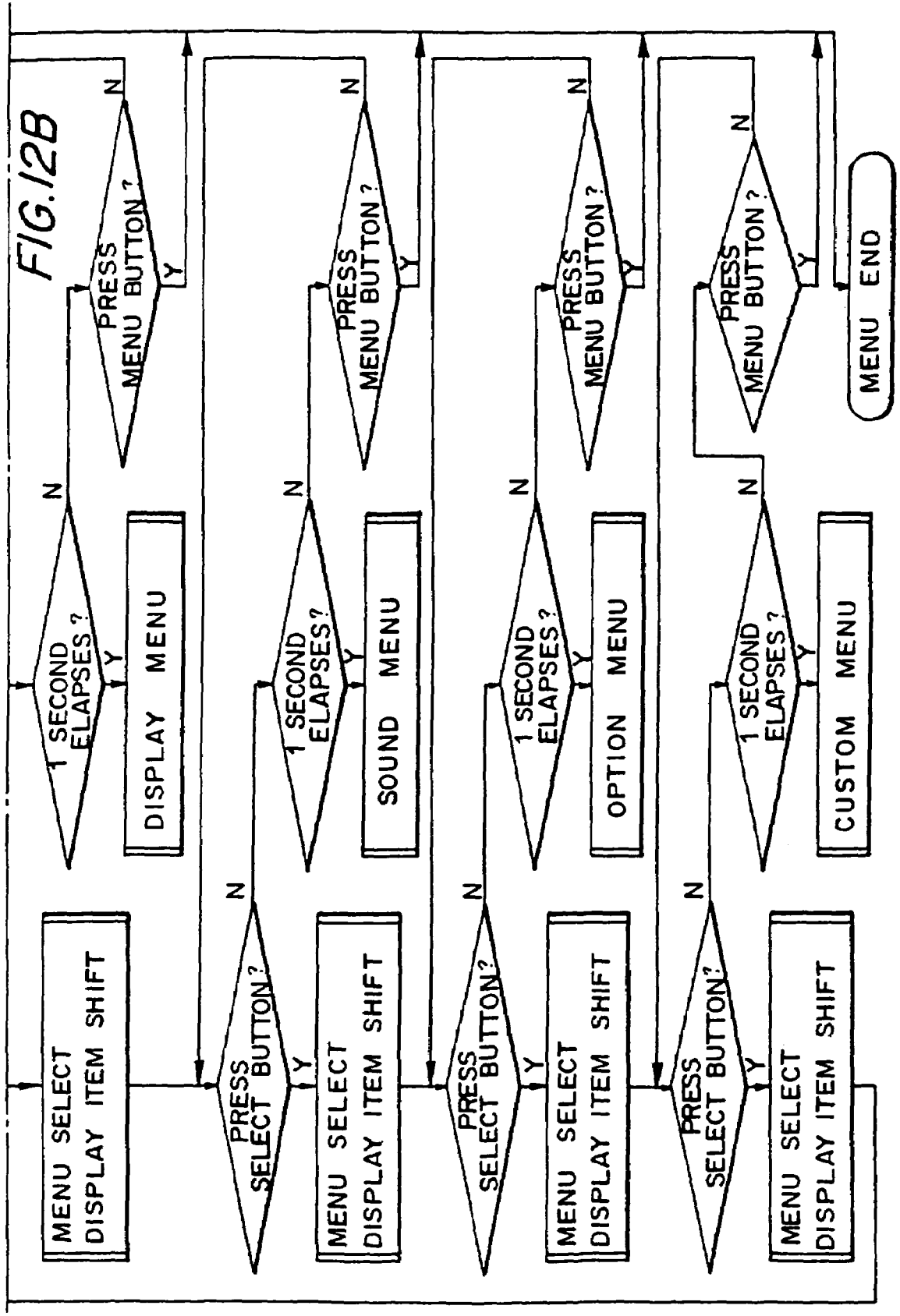
FIG. 12 is a flow chart of the projector function adjustment operation procedure.

The projector 10 according to this embodiment comprises an adjustment operating section (not shown in the figures) whereby operating the facilities such as menu and select buttons of this adjustment operating section, can select and display predetermined menu screens such as indicated by the flow chart of FIG. 12, while a desired menu screen is displayed, adjustment is performed by operating predetermined adjustment buttons corresponding to adjustment items displayed on the screen.

In the case of this example, following are among the functions adjusted by referring to the respective menu screens, Computer menu screen: screen brightness and contrast;
Video menu screen: red, blue and green;
Display menu screen: tracking and signal format;
Sound menu screen: volume, and left and right balance;
Option menu screen: input source select and language; and
Custom menu screen: program button function assignment and switching.

The remote controller 20 operating section 400 also comprises functions for adjusting the projector 10. In the case of the present example, projector 10 adjustments using the remote controller 20 are mainly performed by combined operation of a menu button 22j, select button 22e and trackball section 28. As indicated in FIG. 3, in order to enable the user to visually distinguish the adjustment functions of the buttons 22j and 22e, and the trackball section 28, uniform colors identify the respective areas 402j, 402e and 404 of the substrate 402 where the buttons 22j, 22e and trackball section 28 are disposed.

Figure 13A:
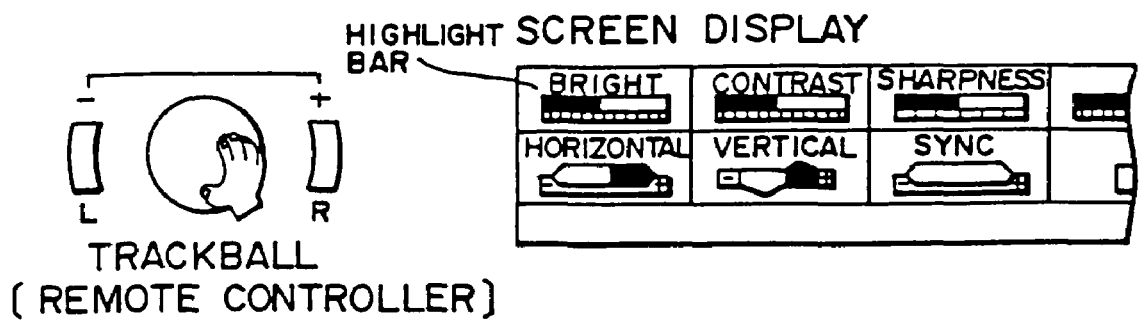
FIG. 13 is a descriptive drawing indicating the projector function adjustment procedure using the remote controller.
Figure 13B:
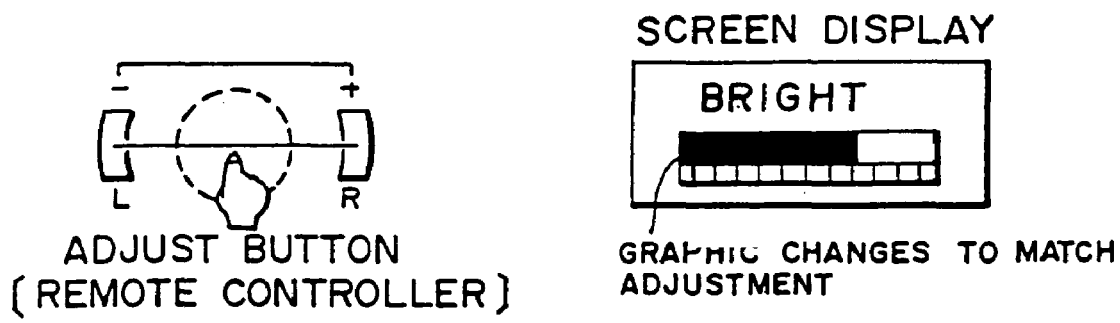
Figure 13C:
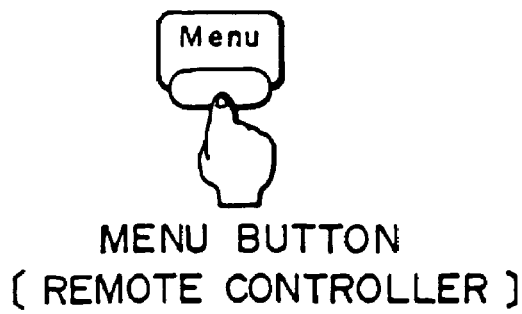

Following is a description of projector 10 adjustment using the remote controller 20 with reference to FIGS. 12 and 13.

Press the remote controller 20 menu button 22j, then operate the select button 22j to select a desired menu screen from among four menu screens. The menu button 22j and select button 22e operation signals are wirelessly transmitted from the remote controller 20 to the projector 10. On the bases of these received signals, the projector 10 operates in the same manner as when operating the adjustment mechanism provided in the projector itself.

Figure 15:
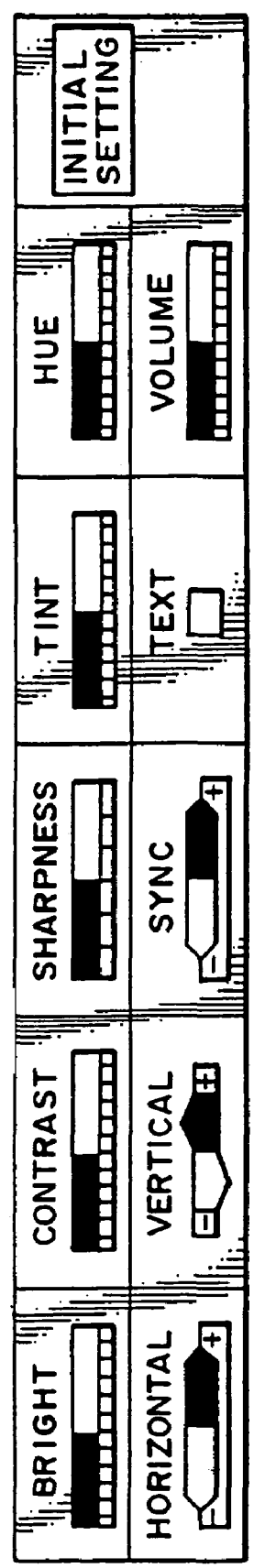
FIG. 15 is a descriptive drawing illustrating an example of a function adjustment screen displayed when using the projector.

In order to simplify the description, an example of selecting the computer menu screen, indicated in FIG. 15, is described below.

Figure 14:
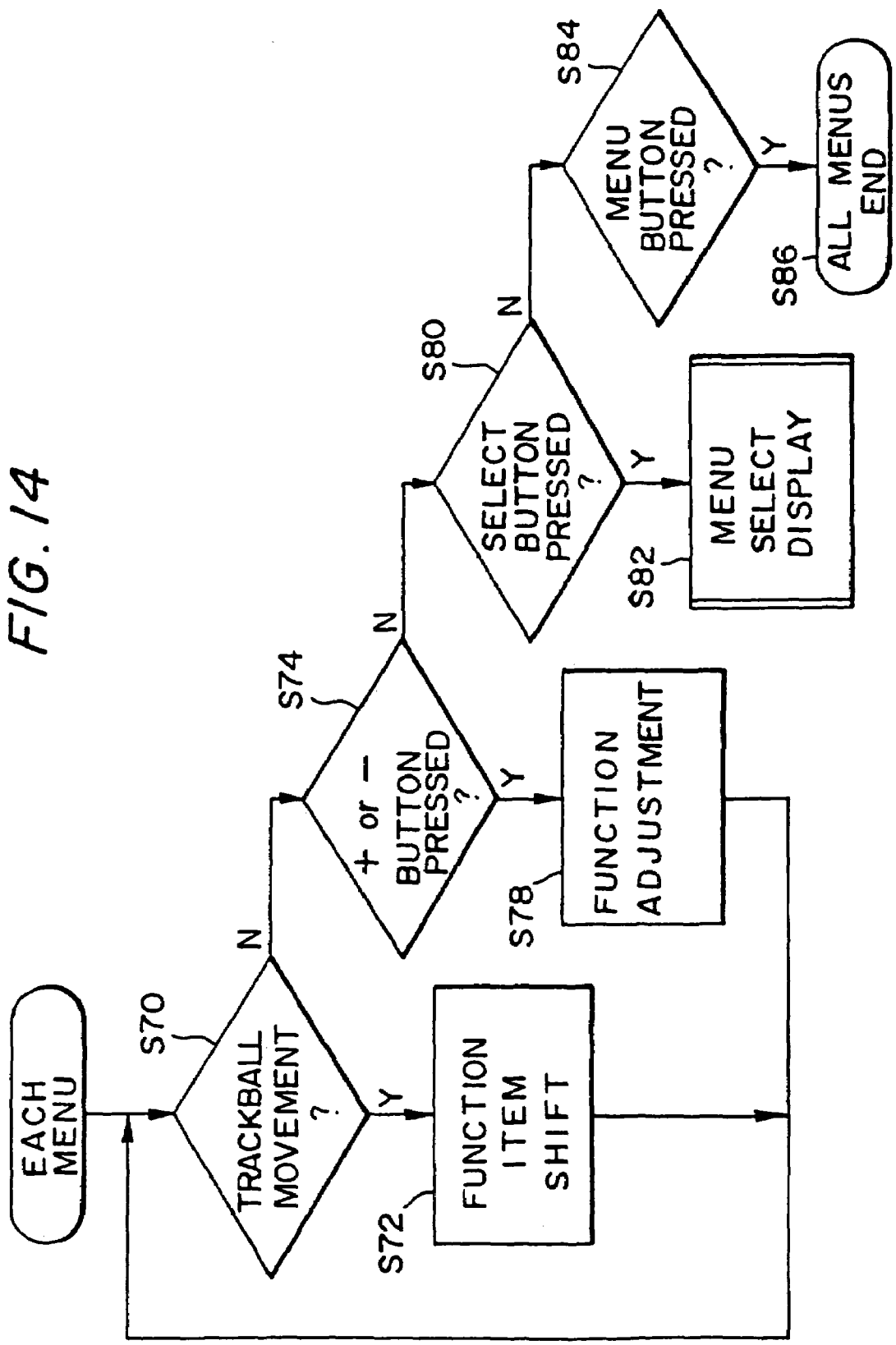
FIG. 14 is a flow chart of the projector function adjustment using the remote controller.

FIG. 13 illustrates the remote controller operating procedure for selecting a desired item from the computer menu screen and adjusting the corresponding function. A flow chart of the procedure is shown in FIG. 14.

When the FIG. 15 computer menu is selected, the Bright adjustment item of the menu is initially highlighted, thereby indicating this function has been selected for adjustment.

To select another function item, the user operates the trackball 28a as indicated in FIG. 13A. The projector 10 receives the operating signal and sequentially shifts the function items in response to the trackball operation (steps S70 and S72). When the desired item has been selected, the user stops trackball operation and uses the left and right adjust buttons 28c and 28c to adjust the function as shown in FIG. 13B. Pressing the plus button increases the adjustment value and pressing the minus button decreases the adjustment value, as indicated by the graphic display (steps S74 and S78).

By repeating this procedure of selecting a desired function item and adjusting the selected function item, each function item can be adjusted in sequence.

After completing the adjustments of the computer menu screen, the next menu screen can be selected by simply operating the select button 22e (steps S80 and S82). By repeatedly operating the select button a desired number of times, the menu screens are selected and displayed according to the flow chart of FIG. 12. To then adjust selected function items within a selected menu screen, merely perform in the same manner as steps S70–S78 indicated in FIG. 14.

When all function adjustments have been completed, press the remote controller 20 menu button 22j (step S84) to thereby end the menu display (step S86).

As described above, the system according to the present embodiment enables adjusting the projector 10 functions by using the remote controller 20. In particular, the buttons and trackball section 28 used for combined operation of the remote controller 20 are designated by the same colors on the substrate and since the relationships are easily identified visually, usage is rendered highly convenient.

The foregoing description does not limit the present invention and numerous variations are possible within the scope of this invention.

For example, the above description related to an example of using this invention for a presentation system. However, this invention can also be applied to numerous other types of systems as required, for example, teaching systems conveying lessons from instructor to students and systems for various types of seminars, in addition to sales demonstration systems and others.

An example of using infrared light for wireless transmission between the remote controller 20 and projector 10 was also described. However, other methods, such as various types of radio signals, can also be used as required.

The description also related to an example of using a projector 10 as the projection stage. However, this invention can also be applied to numerous other types of projection devices, such as overhead projectors.

The description also mentioned an example of using a trackball as the pointing device for the remote controller 20. However, various other types of pointing devices can also be used for the remote controller according to requirements.

What is claimed is:

1. An image projection system comprising:
a projection section which projects an image; and
a remote controller for the projection section,
the remote controller including:
  an operation section which includes a pointing device and operation keys; and
  a transmission section which transmits an operation signal from the operation section,
the projection section including:
  an image receiving section which receives an image signal of the image from a main control section;
  a signal receiving section which receives the operation signal from the operation section;
  an adjustment section which makes the projection section adjustable based on predetermined operation signals from the operation keys and adjusts the projection section based on predetermined combination operation signals from combining operations of the pointing device and operation keys; and
  a processing section which feeds an operation signal from the pointing device to the main control section, so that a display position of a pointer included in the image changes based on the operation signal from the pointing device at any time other than when the projection section is adjustable,
the operation keys including menu keys for instructing display of an adjustment menu on a display screen, and
the adjustment section projecting a predetermined menu image onto the projection section and makes the projection section adjustable based on operation signals from the menu keys, the adjustment section subsequently selecting a desired item from operation items on the adjustment menu displayed on the display screen based on the operation signal from the pointing device.

2. The image projection system according to claim 1, the adjustment section adjusting the selected item based on the operation signal from the operation section.

3. The image projection system according to claim 1, the projection section feeding the operation signals from the respective pointing device and operation keys to the main control section, so that a display position of the pointer included in the image changes and the main control section exerts particular control over the projection section, when the projection section is under control of the main control section.

4. The image projection system according to claim 3, the main control section displaying a pointer on a projected image based on an operation signal from the main operation section which includes a main pointing device and controls a display position of the pointer based on the operation signal from the main pointing device, when the operation signal from the main pointing device contends with the operation signal from the pointing device of the remote controller.

5. The image projection system according to claim 4, the main control section, in which an application program for controlling the projection section is installed, controlling the projection section based on the application program and the operation signal from the main operation section.

6. The image projection system according to claim 4, the remote controller further comprising operation keys to which operations of the main operation section are assigned, and the main control section further comprising an operation assigning section which assigns operations of the main operation section to the operation keys of the remote controller and controls the projection section based on input signals from the operation keys.

7. The image projection system according to claim 6, the main control section further comprising a detecting section which detects an operation signal from the remote controller contending with an operation signal from the main operation section, the main control section controls the projection section based on an operation signal from the main operation section, when the operation signal from the remote controller contends with the operation signal from the main operation section.

8. The image projection system according to claim 1, the main control section being a personal computer.

* * * * *